United States Patent
Yang

(10) Patent No.: US 8,408,711 B2
(45) Date of Patent: Apr. 2, 2013

(54) PROJECTOR AND REFLECTOR THEREOF

(75) Inventor: Song-Ling Yang, Shenzhen (CN)

(73) Assignees: Hong Fu Jin Precision Industry (ShenZhen) Co., Ltd., Shenzhen (CN); Hon Hai Presicion Industry Co., Ltd., New Taipei (TW)

( * ) Notice: Subject to any disclaimer, the term of this patent is extended or adjusted under 35 U.S.C. 154(b) by 29 days.

(21) Appl. No.: 13/236,592

(22) Filed: Sep. 19, 2011

(65) Prior Publication Data

US 2012/0300177 A1    Nov. 29, 2012

(30) Foreign Application Priority Data

May 27, 2011    (CN) .......................... 2011 1 0140740

(51) Int. Cl.
 *G03B 21/28*    (2006.01)
(52) U.S. Cl. .......................... 353/31; 315/129
(58) Field of Classification Search ................ 353/31; 315/129
See application file for complete search history.

(56) References Cited

U.S. PATENT DOCUMENTS

2009/0236993 A1*    9/2009    Ishii .............................. 315/129

* cited by examiner

*Primary Examiner* — Seung C Sohn
(74) *Attorney, Agent, or Firm* — Altis Law Group, Inc.

(57) ABSTRACT

A reflector applied in a projector including a projection control circuit, a light source unit, a beam combiner, and a lens is disclosed. The reflector includes a transparent electrode layer, an electrophoresis layer and a pixel electrode layer. The electrophoresis layer includes a plurality of micro cups, each micro cup contains suspension therein and a plurality of charged particles. The pixel electrode layer includes a plurality of pixel electrodes corresponding to the micro cups. The projection control circuit provides voltages between each pixel electrode and the transparent electrode layer to drive the charged particles to migrate. When the charged particles arrive at the transparent electrode layer, the lights from the light source unit are reflected by the charged particles to the beam combiner to be combined into an image to be transmitted to the lens to project an image.

16 Claims, 3 Drawing Sheets

PROJECTOR AND REFLECTOR THEREOF

BACKGROUND

1. Technical Field

The present disclosure relates to projectors and their reflectors.

2. Description of Related Art

Digital Light Processing (DLP) projectors and Liquid Crystal on Silicon (LCoS) projectors are two kinds of color digital projectors. For DLP projectors, images projected on a projection surface are created by microscopically small mirrors on a semiconductor chip known as Digital Micromirror Device (DMD). The LCoS projector is similar to a DLP projector except that it adopts liquid crystals instead of individual mirrors. However, the cost of the DLP projectors is expensive, and the LCoS manufacturing process is complex. Therefore, it is desirable to provide a projector to solve the above problems.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
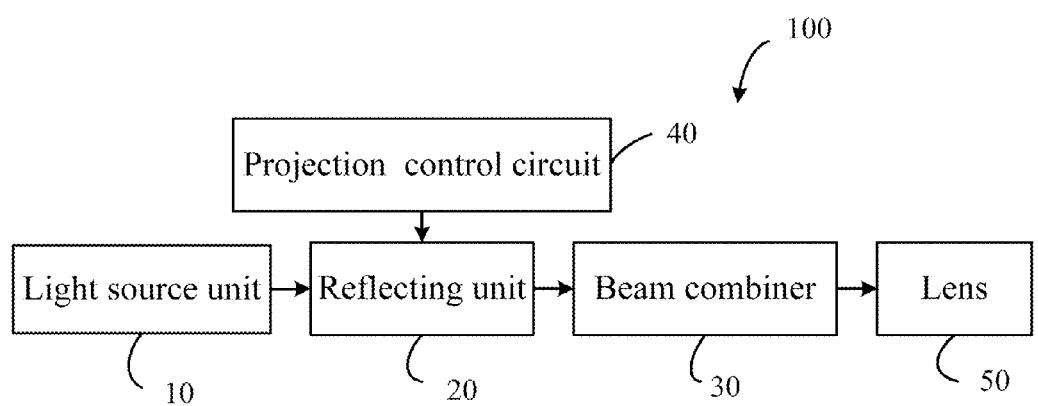
FIG. 1 is a block diagram of a projector in accordance with an exemplary embodiment.
Figure 2:
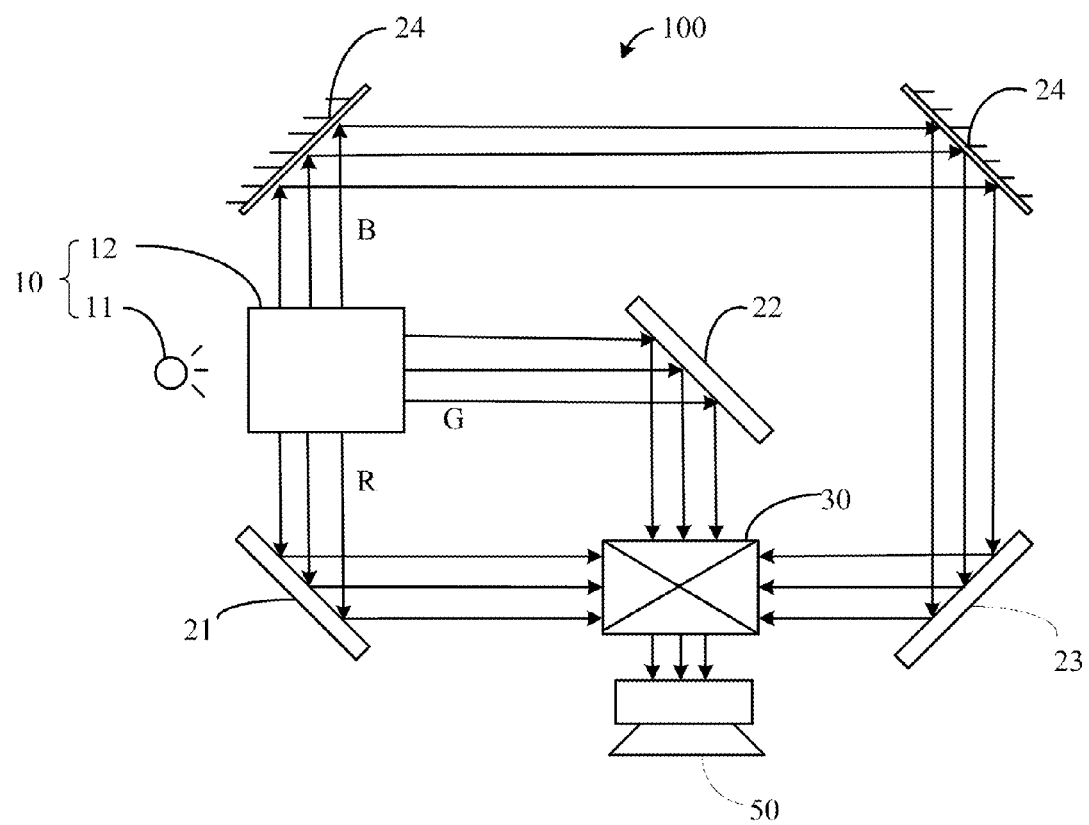
FIG. 2 is a schematic view showing an optical path of the projector of FIG. 1.

Referring to FIGS. 1-2, the projector 100 includes a light source unit 10, a reflecting unit 20, a beam combiner 30, a projection control circuit 40 to control the reflectivity of the reflecting unit 20, and a lens 50.

The light source unit 10 emits a number of colored lights, such as red, green, and blue lights, to the reflecting unit 20. In this embodiment, the light source unit 10 includes a light source 11 to emit white light and a dispersion member 12 to separate the white light into red, green, and blue light, and transmit the red light, the green light, and the blue light to the reflecting unit 20.

The reflecting unit 20 includes a number of reflectors, each reflector corresponding to one color light emitted by the light source unit 10. In this embodiment, the number of the reflectors is three. The dispersion member 12 respectively transmits the red light, the green light, and the blue light to their corresponding reflectors. The reflectors are then controlled by the projection control circuit 40 to reflect the lights to the beam combiner 30 to combine the red light, the green light, and the blue light into an image, and then the image is transmitted from the beam combiner 30 to the lens 50 to project a color image.

In this embodiment, the reflecting unit 20 includes two mirrors 24, a first reflector 21, a second reflector 22, and a third reflector 23 respectively arranged around the beam combiner 30. The first reflector 21, the second reflector 22, and the third reflector 23 cooperate with the two mirrors 24 to reflect the red light, the green light, and the blue light to the beam combiner 30.

Figure 3:
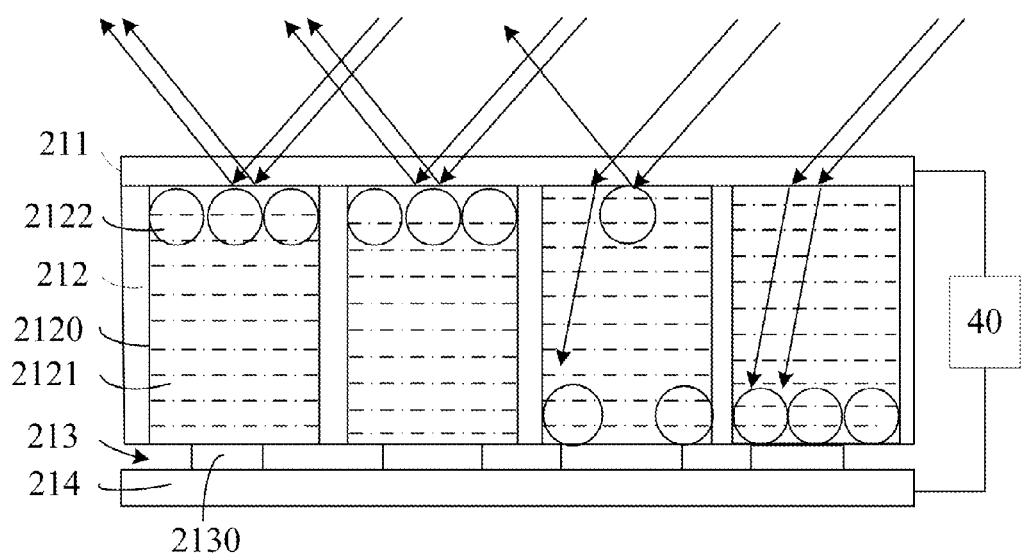
FIG. 3 is a schematic view showing a reflector of the projector of FIG. 1, in accordance with an exemplary embodiment.

Referring to FIG. 3, the structure of the first reflector 21, the second reflector 22, and the third reflector 23 are the same. Each reflector includes a transparent electrode layer 211, an electrophoresis layer 212, a pixel electrode layer 213, and a base 214. The electrophoresis layer 212 is electrically connected between the transparent electrode layer 211 and the pixel electrode layer 213. The lights from the light source unit 10 are transmitted to the electrode layer 211. In this embodiment, the transparent electrode layer 211 is made of transparent conductive materials, such as Indium-Tin-Oxide (ITO).

The electrophoresis layer 212 includes a number of micro cups 2120 arranged in a matrix and each corresponding micro cups 2120 in all three reflectors corresponds to a same pixel of a projected image. Each micro cup 2120 contains suspension 2121 therein and a number of charged particles 2122 dispersed in the suspension 2121. In this embodiment, each charged particle 2122 is reflective and is approximately one micrometer in diameter, and the polarities of the particles 2122 are the same.

The pixel electrode layer 213 includes a number of pixel electrodes 2130 arranged on the base 214 in a matrix, and each pixel electrode 2130 corresponds to a micro cup 2120, that is, each pixel electrode 2130 corresponds to a pixel of the projected image. The pixel electrodes 2130 are connected to the projection control circuit 40. The projection control circuit 40 provides voltages between each pixel electrode 2130 and the transparent electrode layer 211 of each reflector. When the voltage is applied, the charged particles 2122 will migrate to the transparent electrode layer 211 or the pixel electrode layer 213. For best understanding, take the polar of the charged particles 2122 being positive for an example. If a negative voltage is provided to the pixel electrode layer 213, the charged particles 2122 will migrate to the pixel electrode layer 213, and if the negative voltage is provided to the transparent electrode layer 211, the charged particles 2122 will migrate to the transparent electrode layer 211. When the charged particles 2122 arrive at the transparent electrode layer 211, the lights from the light source unit 10 are reflected by the charged particles 2122 to the beam combiner 30. When the charged particles 2122 arrive at the pixel electrode layer 213, the lights from the light source unit 10 pass through the transparent electrode layer 211 and reach the suspension 2121, thus the lights can not be reflected. The projection control circuit 40 further changes the value of the voltages between the pixel electrode 2130 and the transparent electrode layer 211 rapidly according to the color of each pixel of the projected image. When the value of the voltage is changed, the number of the charged particles 2122 on the transparent electrode layer 211 changes accordingly, which causes the reflectivity of the reflector to be changed. The greater the reflectivity is, the bright the color formed on the projected image is.

The beam combiner 30 combines the lights reflected by the first reflector 21, the second reflector 22, and the third reflector 23 to form a projected image.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A projector comprising:
   a projection control circuit;
   a light source unit to emit a plurality of colored lights;
   a beam combiner;
   a lens;
   a reflecting unit comprising a plurality of reflectors, each of the reflectors being correspond to one colored light emitted by the light source unit and being controlled by the projection control circuit to reflect the colored light, each of the plurality of the reflectors comprising:
      a transparent electrode layer;
      an electrophoresis layer comprising a plurality of micro cups arranged in a matrix, each of the micro cups comprising suspension therein and a plurality of charged particles dispersed in the suspension; and
      a pixel electrode layer comprising a plurality of pixel electrodes, each of the plurality of pixel electrodes corresponding to one of the micro cups, the electrophoresis layer being electrically connected between the transparent electrode layer and the pixel electrode layer;
   wherein, the projection control circuit is to provide voltages between each pixel electrode of the pixel electrode layer and the transparent electrode layer of each reflector to drive the charged particles to migrate to the transparent electrode layer; when the charged particles arrive at the transparent electrode layer, the lights from the light source unit are reflected by the charged particles, the beam combiner is to combine the lights reflected by the reflectors into an image and then the image is transmitted from the beam combiner to the lens to project an image.

2. The projector described as claim 1, wherein the light source unit comprises a light source to emit white light and a dispersion member to separate the white light into the plurality of colored lights.

3. The projector described as claim 2, wherein the dispersion member is to separate the white light into red light, green light, and blue light.

4. The projector described as claim 3, wherein the number of the reflectors is three, the three reflectors are respectively to reflect the red light, the green light, and the blue light.

5. The projector described as claim 1, wherein the transparent electrode layer of each reflector is made of a transparent conductive material.

6. The projector described as claim 1, wherein each of the micro cups corresponds to a pixel of the projected image.

7. The projector described as claim 6, wherein each corresponding micro cups in all reflectors correspond to a same pixel of the projected image.

8. The projector described as claim 1, wherein each of the charged particles is reflective and the polarities of the charged particles are the same.

9. The projector described as claim 1, wherein the projection control circuit is further to change the value of the voltages between the pixel electrodes and the transparent electrode layer according to the color of each pixel of the projection image, when the value of the voltage between the pixel electrode and the transparent electrode layer is changed, the number of the charged particles on the transparent electrode layer changes accordingly, which causes the reflectivity of the reflector to be changed.

10. The projector described as claim 1, wherein each of the reflectors further comprises a base, the pixel electrodes of the pixel electrode layer are arranged in matrix on the base.

11. A reflector applied in a projector, the projector comprising a projection control circuit, a light source unit, a beam combiner, and a lens, the reflector comprising:
    a transparent electrode layer;
    an electrophoresis layer comprising a plurality of micro cups arranged in a matrix, each of the micro cups comprising suspension therein and a plurality of charged particles dispersed in the suspension; and
    a pixel electrode layer comprising a plurality of pixel electrodes, each of the plurality of pixel electrodes being correspond to one of the micro cups, the electrophoresis layer being electrically connected between the transparent electrode layer and the pixel electrode layer;
    wherein a voltage provided by the projection control circuit and applied to each pixel electrode of the pixel electrode layer and the transparent electrode layer of each reflector is able to drive the charged particles to arrive at the transparent electrode layer, when the changed particles arrive at the transparent electrode layer, the lights from the light source unit are reflected by the charged particles to the beam combiner to be combined into an image and the image is transmitted from the beam combiner to the lens to project an image.

12. The reflector described as claim 11, wherein the transparent electrode layer of each reflector is made of a transparent conductive material.

13. The reflector described as claim 11, wherein each charged particle is reflective and the polarities of the charged particles are the same.

14. The reflector described as claim 11, wherein each of the reflectors further comprises a base, the pixel electrodes of the pixel electrode layer are arranged on the base.

15. The reflector described as claim 11, wherein each of the micro cups corresponds to a pixel of the projected image.

16. The reflector described as claim 15, wherein each corresponding micro cups in all reflectors correspond to a same pixel of the projected image.

* * * * *